Nov. 4, 1930.  E. L. GORDON  1,780,875
BOTTLE CAP AND MEASURING DEVICE
Filed Nov. 25, 1927
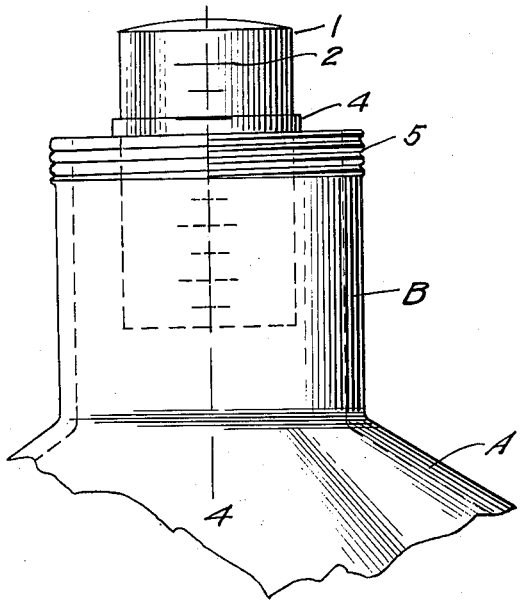
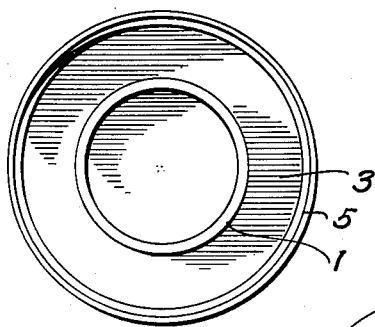
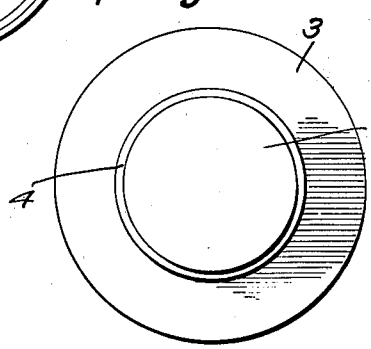
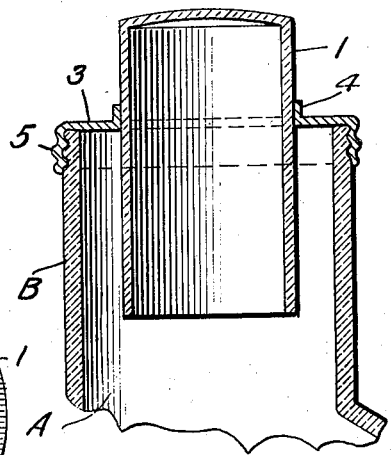
Edward L. Gordon INVENTOR
BY *Victor J. Evans*
ATTORNEY
WITNESS:

Patented Nov. 4, 1930

1,780,875

UNITED STATES PATENT OFFICE

EDWARD L. GORDON, OF McKEES ROCKS, PENNSYLVANIA

BOTTLE CAP AND MEASURING DEVICE

Application filed November 25, 1927. Serial No. 235,707.

This invention relates to measuring devices and its general object is to provide a combined bottle cap and measuring glass associated in a manner for closing a bottle when applied thereto, and when removed therefrom, the cap may be used to cooperate with the glass to aid in measuring quantities of the contents of the bottle taken therefrom.

A further object of the invention is to provide a combined bottle cap and measuring glass associated to provided a single unit for the purpose as above set forth, and is simple in construction, inexpensive to manufacture and efficient in operation and service.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:

Figure 1 is a front elevation of the device forming the subject matter of the present invention and showing the same applied to a bottle.

Figure 2 is a bottom plan view thereof.

Figure 3 is a top plan view.

Figure 4 is a sectional view taken approximately on line 4—4 of Figure 1.

Referring to the drawings in detail, the letter A indicates a bottle having a neck B which is provided with threads at its upper end as best shown in Figure 4 of the drawings.

The device forming the subject matter of the present invention includes a measuring glass 1 of substantially elongated formation having arranged upon its outer surface in any well known manner, a plurality of lines disposed in superposed relation to provide graduations 2 as will be apparent.

The measuring glass 1 is mounted for slidable movement in the cap portion 3 of the device which is provided with an annular flange 4 disposed for frictional engagement with the sides of the glass as best shown in Figure 4 of the drawings. The cap portion 3 is further provided with a threaded flange 5 to receive the threads of the neck B for securing the device to the bottle in a manner to provide a substantially leak proof connection therewith.

When it is desired to measure a quantity of the contents of the bottle, the device is removed therefrom and the measuring glass is moved through the cap portion 3 until the desired graduation is aligned with the outer edge of the annular flange 4, with the result the desired quantity may be measured in a quick and accurate manner and by persons with defective eye sight as it will be obvious that the measuring glass can be moved by a person who can readily see the graduations and be retained in such position for use by persons having defective eyesight. Of course, the graduations can be used without the cooperation of the flange 4.

While I have designated the member 2 as being formed from glass, it will be obvious that the member 2 as well as the cap portion 3 of the device may be formed from any desired material suitable for the purpose and the member 2 may be of a size to snugly engage the neck of the bottle without departing from the spirit of the invention.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:

A combined bottle closure and measuring device, comprising a cap having an annular depending flange for association with the bottle, and characterized by an enlarged centrally located opening, an upwardly extending flange rising from the edge of said opening, a one-piece cup like measuring vessel arranged in said opening and frictionally supported by the last mentioned flange, said vessel being normally inverted and used as a stopper, and adapted to be arranged in an upright position for use subsequent to the removal of the cap from the bottle and inverting said cap, and graduations provided on said vessel and cooperating with the last mentioned flange of the cap as and for the purpose specified.

In testimony whereof I affix my signature.

EDWARD L. GORDON.